United States Patent [19]
Kotwicki et al.

[11] Patent Number: 6,089,082
[45] Date of Patent: Jul. 18, 2000

[54] AIR ESTIMATION SYSTEM AND METHOD

[75] Inventors: Allan Joseph Kotwicki, Williamsburg; Donald J. Lewis, Brighton; John David Russell, Farmington Hills; Ross Dykstra Pursifull, Dearborn, all of Mich.

[73] Assignee: Ford Global Technologies, Inc., Dearborn, Mich.

[21] Appl. No.: 09/206,752

[22] Filed: Dec. 7, 1998

[51] Int. Cl.[7] ............................ G01M 15/00; F02D 41/18
[52] U.S. Cl. ............................................. 73/118.2; 701/103
[58] Field of Search .................................. 123/478, 480, 123/486, 494; 701/103, 102, 115; 73/117.3, 118.2

[56] References Cited

U.S. PATENT DOCUMENTS

| | | | |
|---|---|---|---|
| 4,928,654 | 5/1990 | Hosaka | 123/486 |
| 4,951,499 | 8/1990 | Akimoto | 73/118.2 |
| 4,995,258 | 2/1991 | Frank | 73/118.2 |
| 5,159,914 | 11/1992 | Follmer et al. | 123/494 |
| 5,228,336 | 7/1993 | Nagaishi | 73/118.2 |
| 5,331,936 | 7/1994 | Messih et al. | 123/480 |
| 5,497,329 | 3/1996 | Tang | 73/118.2 |
| 5,555,870 | 9/1996 | Asano | 73/118.2 |
| 5,635,634 | 6/1997 | Reuschenbach et al. | 73/118.2 |
| 5,845,627 | 12/1998 | Olin et al. | 73/118.2 |
| 5,889,205 | 3/1999 | Treinies et al. | 73/118.2 |

*Primary Examiner*—Willis R. Wolfe
*Attorney, Agent, or Firm*—Allan J. Lippa

[57] ABSTRACT

A system and method for estimating air entering a cylinder of an internal combustion engine uses a discrete algorithm based on a measurement of air entering a manifold. The filter parameter of the algorithm is independent of ambient operating conditions when the algorithm is executed at constant intervals of engine rotation.

6 Claims, 3 Drawing Sheets

AIR ESTIMATION SYSTEM AND METHOD

FIELD OF THE INVENTION

The present invention relates to an estimation method for estimating an air quantity entering the cylinder of an internal combustion engine where a throttle mass air flow signal is used.

BACKGROUND OF THE INVENTION

Engine control systems require accurate control of the air/fuel ratio for controlling regulated emissions. In addition fuel economy improvements from operating the engine in the lean region also require precise air/fuel ratio control. For precise air/fuel control, an open loop estimate of the air entering the engine is required due to the delayed exhaust sensor response. The open loop estimate of air entering the cylinder, or cylinder air charge, is a particular problem when using a mass air flow sensor. The problem is due to the manifold volume, which tends to add dynamics that separate the air measured at the throttle body by the mass air flow sensor and from air inducted into the cylinder.

One approach to estimating the cylinder air charge is to use a first order difference equation that represents the manifold dynamics. In this system, the difference equation parameter, or filter parameter, is a function of volumetric efficiency, which is in turn a function of atmospheric conditions. For example, the filter parameter is a function of barometric pressure and air temperature. Each of these parameters is constantly monitored and used to recalculate the filter parameter during every operation of the estimation method. In addition the difference equation uses past parameters, thus requiring intermediate parameter storage. Such a system is described in U.S. Pat. No. 5,331,936.

The inventors herein have recognized a disadvantage with the above system. The nature of the difference equation requires extensive testing and parameter mapping across many conditions, such as, for example, changes in barometric pressure and air temperature. As a result, calibration effort of such an estimation scheme is greater than necessary. In addition because the parameter values are functions of many other parameters, extensive computation power is required for performing all of the necessary computations. Further, past parameter storage requires additional memory and computer operation time.

SUMMARY OF THE INVENTION

An object of the invention claimed herein is to provide a method for estimating an air quantity entering a cylinder of an internal combustion engine having a manifold and an air flow sensor coupled to the manifold. The method comprises the steps of measuring a quantity of air entering the manifold based on the air flow sensor, calculating a first filter parameter independent of ambient conditions, said first filter parameter based on a manifold volume, a number of cylinders, a displacement volume, and a stored slope of a graph between manifold pressure and air quantity entering any one of the cylinders, calculating a second filter parameter as one minus said first filter parameter, and estimating the air quantity entering the cylinder based on said measured air quantity entering the manifold, said first filter parameter, and said second filter parameter.

By estimating the air quantity entering the cylinder based on the air entering the manifold and using a first order difference equation with a filter parameter suitably calculated solely as a function independent of ambient operating conditions, such as, for example, as a function of a stored slope of a graph between manifold pressure and cylinder air charge, it is possible to obtain a more accurate estimation than prior art estimation. In addition, by performing the estimation in this way, complex calculations for determining the effect of unnecessary parameters, such as, for example, barometric pressure and gas temperature, are not required. In other words, prior art has used the term volumetric efficiency as a parameter in air charge estimation systems. Since volumetric efficiency is a function of barometric pressure, temperature and several other factors, to obtain an accurate estimate, all of these factors must be included. In the present invention, an alternate formulation is used in which volumetric efficiency is dissected. This removes the dependencies on barometric pressure, temperature, etc., resulting in a simple and more accurate estimation scheme. Further, because the present invention provides a simpler estimation scheme, calibration efforts are significantly reduced. Also, computation time and memory can be reduced because of the reduced complexity.

An advantage of the above aspect of the invention is increased air charge estimation.

Another, more specific, advantage of the present inventions is improved emission control.

Another advantage of the above aspect of the invention is reduced calibration cost.

Yet another advantage of the above aspect of the invention is reduced system cost.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein.

DETAILED DESCRIPTION OF THE PREFERRED EMBODIMENT(S)

Figure 1:
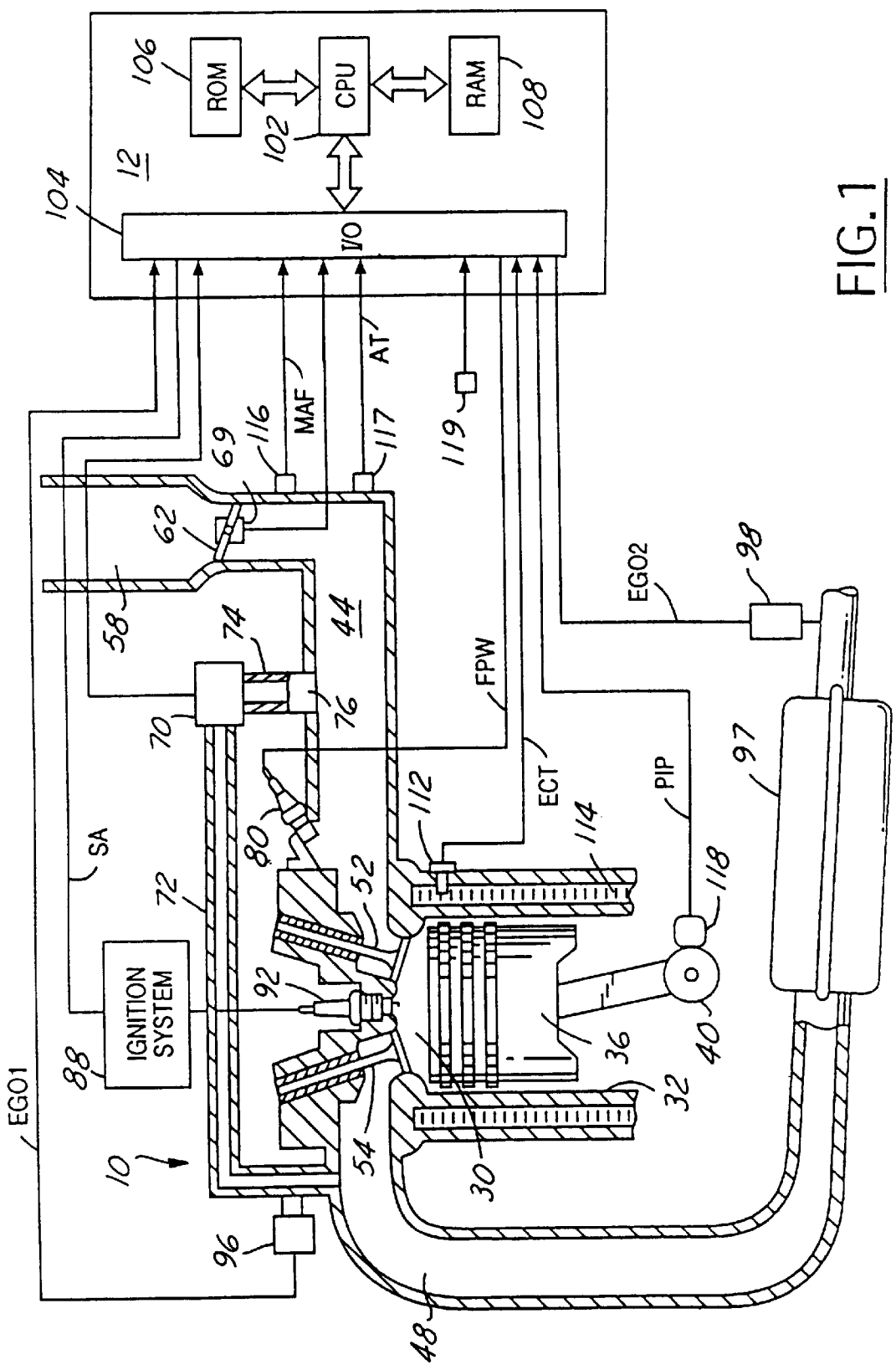
FIG. 1 is a block diagram of an engine in which the invention is used to advantage; and, FIGS. 2–4 are high level flowcharts of various operations performed by a portion of the embodiment shown in FIG. 1.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 and exhaust valve 54. Intake manifold 44 is shown communicating with throttle body 58 via throttle plate 62. Throttle position sensor 69 measures position of throttle plate 62. Exhaust manifold 48 is shown coupled to exhaust gas recirculation valve 76 via exhaust gas recirculation tube 72 having exhaust gas flow sensor 70 therein for measuring an exhaust gas flow quantity. Exhaust gas recirculation valve 76 is also coupled to intake manifold 44 via orifice tube 74. Intake manifold 44 is also shown having fuel injector 80 coupled thereto for delivering liquid fuel in proportion to the pulse width of signal FPW from controller 12. Fuel is delivered to fuel injector 80 by a conventional fuel system (not shown) including a fuel tank, fuel pump, and fuel rail (not shown). Alternatively, the engine may be configured such that the fuel is injected directly into the cylinder of the engine, which is known to those skilled in the art as a direct injection engine.

Conventional distributorless ignition system 88 provides ignition spark to combustion chamber 30 via spark plug 92 in response to controller 12. Two-state exhaust gas oxygen sensor 96 is shown coupled to exhaust manifold 48 upstream of catalytic converter 97. Two-state exhaust gas oxygen sensor 98 is shown coupled to exhaust manifold 48 downstream of catalytic converter 97. Sensor 96 provides signal EGO1 to controller 12 which converts signal EGO1 into two-state signal EGO1S. A high voltage state of signal EGO1S indicates exhaust gases are rich of a reference air/fuel ratio and a low voltage state of converted signal EGO1 indicates exhaust gases are lean of the reference air/fuel ratio. Sensor 98 provides signal EGO2 to controller 12 which converts signal EGO2 into two-state signal EGO2S. A high voltage state of signal EGO2S indicates exhaust gases are rich of a reference air/fuel ratio and a low voltage state of converted signal EGO2S indicates exhaust gases are lean of the reference air/fuel ratio.

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of mass air flow measurement (MAF) from mass flow sensor 116 coupled to intake manifold 44; a measurement (MT) of manifold temperature from temperature sensor 117; a profile ignition pickup signal (PIP) from Hall effect sensor 118 coupled to crankshaft 40, and an engine speed signal (RPM) from engine speed sensor 119. In a preferred aspect of the present invention, engine speed sensor 119 produces a predetermined number of equally spaced pulses every revolution of the crankshaft.

Figure 2:
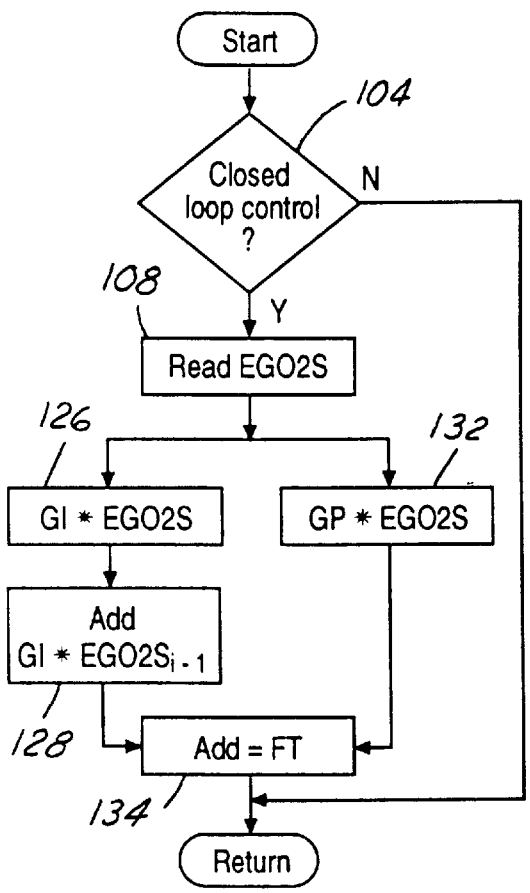

Referring now to FIG. 2, a flowchart of a routine performed by controller 12 to generate fuel trim signal FT is now described. A determination is first made whether closed-loop air/fuel control is to be commenced (step 122) by monitoring engine operation conditions such as temperature. When closed-loop control commences, signal EGO2S is read from sensor 98 (step 124) and subsequently processed in a proportional plus integral controller as described below.

Referring first to step 126, signal EGO2S is multiplied by gain constant GI and the resulting product added to products previously accumulated (GI * EGO2S$_{i-1}$) in step 128. Stated another way, signal EG02S is integrated each sample period (i) in steps determined by gain constant GI. During step 132, signal EG02S is also multiplied by proportional gain GP. The integral value from step 128 is added to the proportional value from step 132 during addition step 134 to generate fuel trim signal FT.

Figure 3:
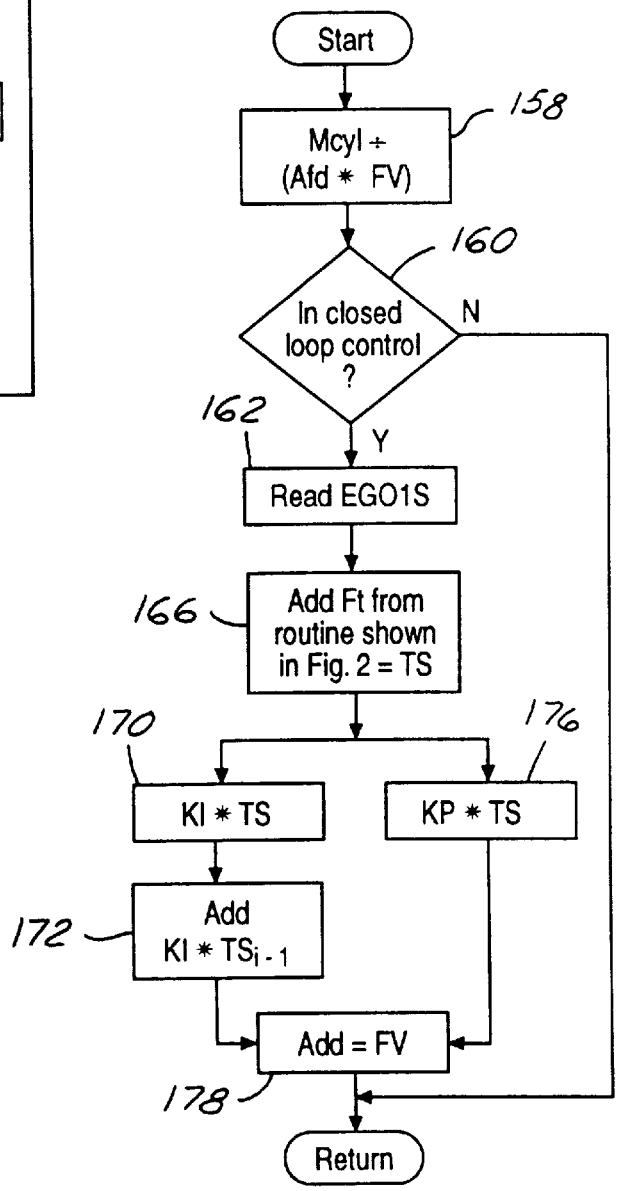

The routine executed by controller 12 to generate the desired quantity of liquid fuel delivered to engine 10 and trimming this desired fuel quantity by a feedback variable related both to sensor 98 and fuel trim signal FT is now described with reference to FIG. 3. During step 158, an open-loop fuel quantity is first determined by dividing the estimated air entering the cylinder for the current step (Mcyl(k) as described later herein with particular reference to FIG. 4), by desired air/fuel ratio Afd, which is typically the stoichiometric value for gasoline combustion. However, setting AFd to a rich value will result in operating the engine in a rich state. Similarly, setting AFd to a lean value will result in operating the engine in a lean state. This open-loop fuel quantity is then adjusted, in this example divided, by feedback variable FV.

After determination that closed-loop control is desired (step 160) by monitoring engine operating conditions such as temperature (ECT), signal EGO1S is read during step 162. During step 166, fuel trim signal FT is transferred from the routine previously described with reference to FIG. 2 and added to signal EGO1S to generate trim signal TS.

During steps 170–178, a proportional plus integral feedback routine is executed with trimmed signal TS as the input. Trim signal TS is first multiplied by integral gain value KI (step 170), and the resulting product added to the previously accumulated products (step 172). That is, trim signal TS is integrated in steps determined by gain constant KI each sample period (i) during step 172. A product of proportional gain KP times trimmed signal TS (step 176) is then added to the integration of KI * TS during step 178 to generate feedback variable FV.

Figure 4:
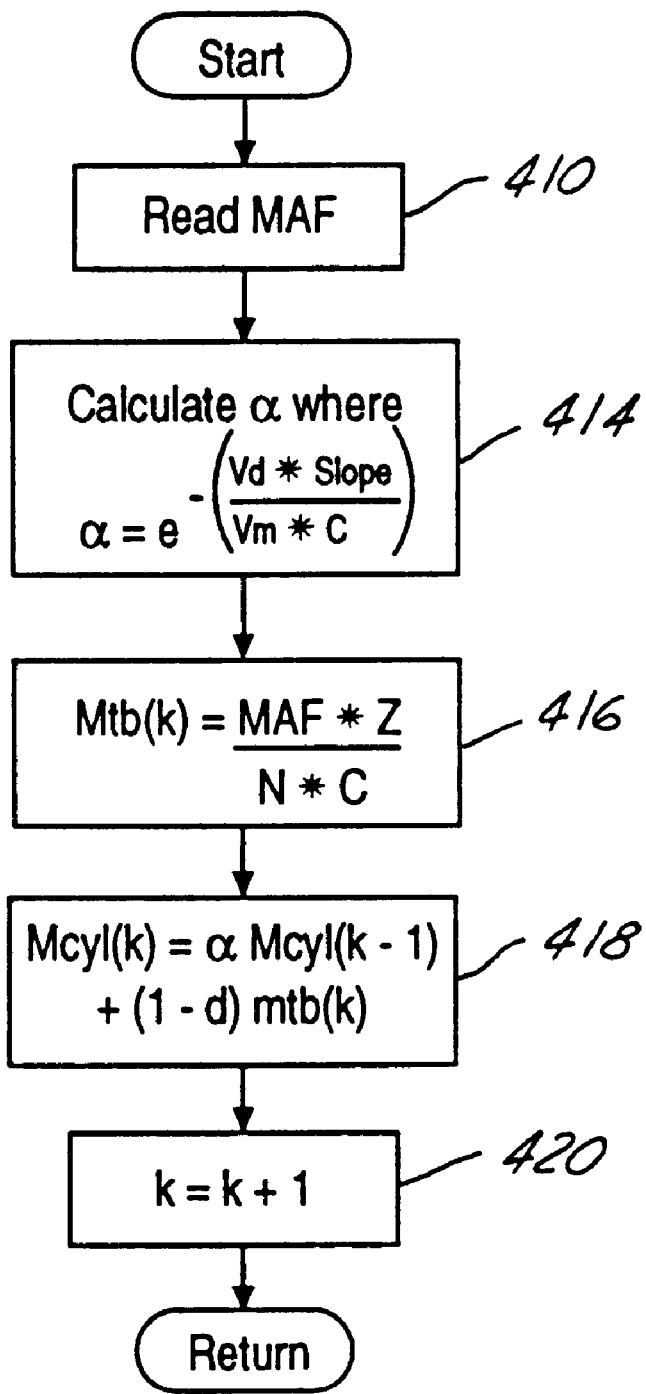

According to the present invention, referring now to FIG. 4, a flowchart of a routine performed by controller 12 to estimate the quantity of air entering the cylinder is described. The routine is executed at constant intervals of engine rotation to simplify calculations. For example, airflow measurement is simplified because of airflow pulsations that occur synchronously with the sampling interval. In step 410, the value of mass air flow sensor (MAF) 116 is read. Then, in step 414, the filter parameter (a) is determined by the following function:

$$a = e^{-(Vd * slope)/(Vm * C)}$$

where e is the exponential function, slope is the single calibratable parameter representing the slope of the graph between manifold pressure and cylinder air charge, and the following are all constant: Vd is the engine displacement volume, Vm is the manifold volume, and C is the number of cylinders. one of ordinary skill in the art and suggested by this disclosure. Also, if the routine is not executed at constant engine rotational intervals, the filter parameter would be calculated by the following function, where T is the sample time:

$$a = e^{-(Vd * slope * T)/(N * Vm * C)}$$

Next, in step 416, the air entering the manifold, mtb(k) is calculated by multiplying MAF by 2 then dividing by the engine speed (N) and the number of cylinders (C). Then, in step 418, the current estimated value of the air entering the cylinder (Mcyl(k)) is calculated using the filter parameter (a), the previous value of the air entering the cylinder (Mcyl(k−1)) and the air entering the manifold (mtb(k)). Then, in step 420, the step counter k is incremented. When the routine is operating at constant intervals of engine rotation, k represents samples at constant intervals of engine rotation. When the routine is operating on a time basis, k represents a time index, similar to i.

There are also other alternative embodiments of the present invention. For example, the filter parameter can be adaptively adjusted using the exhaust sensors. One method would be to increment the filter parameter by a predetermined value when the exhaust sensor indicates the exhaust air/fuel ratio has become rich during a transient. Similarly, the filter parameter would be decremented by a predetermined value when the exhaust sensor indicates the exhaust air/fuel ratio has become lean during a transient. A transient can be detected by methods such as, for example, monitoring the rate of change of the throttle position, the rate of change of signal MAF, or any other method known to those skilled in the art and suggested by this disclosure. Also, due to engine pronounced tuning effects, the parameter slope may need to be adjusted based on a predetermined function of engine speed. In other words, an additional factor K may be added to the function of alpha as shown:

$$a = e^{-(Vd \cdot K \cdot slope)/(Vm \cdot C)}$$

The value of K is a function of engine speed and is obtained from static engine mapping. The value of K represents the change in slope of the static engine map between manifold pressure and cylinder air charge.

While the best mode for carrying out the invention has been described in detail, those skilled in the art in which this invention relates will recognize various alternative designs and embodiments, including those mentioned above, in practicing the invention that has been defined by the following claims.

What is claimed is:

1. A method for estimating an air quantity entering a cylinder of an internal combustion engine having a manifold and an air flow sensor coupled to the manifold, said method comprising:

measuring a quantity of air entering the manifold based on the air flow sensor;

calculating a first filter parameter independent of ambient conditions, said first filter parameter based on a manifold volume, a number of cylinders, a displacement volume, and a stored slope of a graph between manifold pressure and air quantity entering any one of the cylinders;

calculating a second filter parameter as one minus said first filter parameter; and estimating the air quantity entering the cylinder based on said measured air quantity entering the manifold, said first filter parameter, and said second filter parameter.

2. The method recited in claim 1 further comprising the steps of:

measuring an engine speed of the engine; and modifying said stored slope based solely on said engine speed.

3. The method recited in claim 1 wherein said estimating step further comprises the step of estimating the air quantity entering the cylinder by adding a first product of said first filter parameter with a previously calculated value of the air quantity entering the cylinder to a second product of said second filter parameter with said quantity of air entering the manifold.

4. The method recited in claim 1 wherein said method is executed at a first sample rate related to engine cycles.

5. The method recited in claim 4 wherein said step of modifying said stored slope based solely on said engine speed is executed at a second sample rate independent of engine cycles.

6. The method recited in claim 5 wherein said second sample rate is slower than said first sample rate.

* * * * *